(12) United States Patent
Baumgartner

(10) Patent No.: US 7,182,184 B2
(45) Date of Patent: Feb. 27, 2007

(54) DISK BRAKE COMPRISING AN ELECTRIC MOTOR-DRIVEN WEAR ADJUSTING SYSTEM

(75) Inventor: Johann Baumgartner, Moosburg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/475,667

(22) Filed: May 6, 2004

(65) Prior Publication Data

US 2004/0188189 A1    Sep. 30, 2004

Related U.S. Application Data

(63) Continuation of application No. PCT/EP02/04037, filed on Apr. 11, 2002.

(30) Foreign Application Priority Data

Apr. 26, 2001   (DE) ............................... 101 20 327
Mar. 4, 2002    (DE) ............................... 102 09 567

(51) Int. Cl.
   *B60T 13/74*    (2006.01)

(52) U.S. Cl. ............................ 188/156; 188/1.11 L

(58) Field of Classification Search .......... 188/1.11 E, 188/1.11 L, 72.1, 72.7–72.9
See application file for complete search history.

(56) References Cited

U.S. PATENT DOCUMENTS

| | | | | |
|---|---|---|---|---|
| 3,848,705 A | * | 11/1974 | Burnett | 188/71.9 |
| 3,900,084 A | * | 8/1975 | Farr | 188/196 F |
| 4,056,173 A | * | 11/1977 | Farr | 188/71.9 |
| 4,867,283 A | | 9/1989 | Dill | 188/197 D |
| 5,038,895 A | * | 8/1991 | Evans | 188/72.7 |
| 5,366,280 A | * | 11/1994 | Littlejohn | 303/3 |
| 5,568,845 A | * | 10/1996 | Baumgartner et al. | 188/71.9 |
| 6,003,640 A | * | 12/1999 | Ralea | 188/71.5 |
| 6,012,556 A | | 1/2000 | Blosch et al. | 188/71.8 |
| 6,129,183 A | * | 10/2000 | Ward | 188/1.11 L |
| 6,193,021 B1 | * | 2/2001 | Dieckmann et al. | 188/1.11 E |
| 6,250,434 B1 | * | 6/2001 | Baumgartner et al. | 188/71.7 |
| 6,276,494 B1 | * | 8/2001 | Ward et al. | 188/1.11 W |
| 6,279,694 B1 | * | 8/2001 | Bohm et al. | 188/162 |
| 6,293,370 B1 | * | 9/2001 | McCann et al. | 188/71.8 |
| 6,336,686 B2 | * | 1/2002 | Thomas et al. | 303/2 |
| 6,374,958 B1 | * | 4/2002 | Usui et al. | 188/72.7 |
| 6,397,977 B1 | * | 6/2002 | Ward | 188/1.11 L |
| 6,435,625 B1 | * | 8/2002 | Schwarz et al. | 303/20 |
| 6,471,015 B1 | * | 10/2002 | Ralea et al. | 188/1.11 L |
| 6,491,140 B2 | * | 12/2002 | Usui et al. | 188/72.1 |

(Continued)

FOREIGN PATENT DOCUMENTS

DE         19508253 A1      9/1996

(Continued)

*Primary Examiner*—Christopher P. Schwartz
(74) *Attorney, Agent, or Firm*—Crowell & Moring LLP

(57) ABSTRACT

A disk brake apparatus with a readily- releasable wear adjuster, including a brake caliper which overlaps a brake disk, a tensioning device for tensioning brake pads and an adjusting system for compensating for brake pad wear, where the adjusting system includes at least one adjusting rotating device with an electric motor drive for adjusting the brake pad clearance and a release device that assists in releasing the adjusting rotating device when the electric motor drive retracts the brake pads to the specified clearance.

34 Claims, 5 Drawing Sheets

U.S. PATENT DOCUMENTS 6,536,562 B1 * 3/2003 Bohm et al. ................. 188/156
6,550,871 B1 * 4/2003 Bohm et al. .................. 303/20
6,554,108 B1 * 4/2003 Bohm .................... 188/1.11 E
6,662,906 B1 * 12/2003 Bohm et al. ............ 188/1.11 E
6,702,069 B2 * 3/2004 Ralea et al. ................ 188/71.5

FOREIGN PATENT DOCUMENTS

| | | |
|---|---|---|
| DE | 19729024 C1 | 1/1999 |
| DE | 19731696 A1 | 2/1999 |
| DE | 19853721 A1 | 6/1999 |
| DE | 10016162 A1 | 3/2001 |
| EP | 0995921 A2 | 4/2000 |
| EP | 0995923 A2 | 4/2000 |
| WO | 9908018 A1 | 2/1999 |

\* cited by examiner

DISK BRAKE COMPRISING AN ELECTRIC MOTOR-DRIVEN WEAR ADJUSTING SYSTEM

The present application is a continuation of International Patent Application No. PCT/EP02/04037, filed Apr. 11, 2002, designating the United States of America and published in German as WO 02/088562, the entire disclosure of which is incorporated herein by reference. Priority is claimed based on Federal Republic of Germany Patent Application No. 101 20 327.5, filed Apr. 26, 2001.

BACKGROUND AND SUMMARY OF THE INVENTION

The invention relates to a disk brake for commercial vehicles, and particularly to a wear-adjusting system for such disk brakes, as well as to a method for controlling such an adjusting system.

Application devices for disk brakes are known, in the case of which a wear adjusting device, which is independent of the brake application, is driven electromechanically.

Thus, distance sensors can, for example, be utilized for adjusting the release play, whose signals are used for controlling the actuating drive of the adjusting device.

However, controls of this type require high expenditures for the sensing and electronic controlling and are also susceptible to disturbances. Systems of this type are described, for example, in European Patent Document EP 0 995 921 A1, in European Patent Document EP 0 995 923 A2 and in International Patent Document PCT/WO 99/08018.

A clearly simpler and, in addition, reliable operating mode of the wear adjusting system operated by means of an electromechanical drive is possible if, when the brake is not operated, the rotating device causes the brake shoes to briefly come in contact with the brake disk and then, starting from this position, restores them by a predetermined amount which corresponds to the desired release play. Such a method of operation is described in German Patent Document DE 197 31 696 A1. Controls of this type have been successful per se. However, with respect to a special operating case, they require further improvements.

If, specifically at the moment at which the adjusting system applies the brakes shoes to the brake disk for adjusting the release play, another braking is initiated and if, in addition, the brake shoes and the brake disk noticeably heat up because of the resulting heat development, as a result of the expansion, the brake may remain applied after the termination of the braking operation such that, because of the frictional resistance occurring as a result of the interaction in the self-lockingly designed adjusting threads between the adjusting nut and the adjusting spindle, the relatively small dimensioned driving motor of the wear adjusting system can no longer turn back the adjusting system. Because of these effects, the release play at the brake cannot be restored. As a result of this effect, the brake will grind during the drive which causes a further high braking temperature and an extremely high wear.

It is therefore an object of the invention to further develop the disk brake of the above-mentioned type such that, with respect to the method and the construction, a reliable release play is ensured in a simple manner.

According to the idea of the invention, it is provided that, in addition to the electric-motor drive, the adjusting system has a release device which promotes the release of the adjusting rotating device.

If, during the operation of the disk brake, an operating situation occurs in which the electric-motor drive, because of the application of the brake, can no longer correctly adjust the release play, the additional release device will promote this release process. As a result of the joint effect of the electric-motor drive and the supplementary release device, the release play remains precisely adjustable despite the application of the brake.

It is one solution to design the release device to be purely mechanical. As an alternative, it is conceivable to use electromechanically or electronically operated systems for supporting the release effect. Piezo elements can, for example, be used here which, when energized, can eliminate the application of the brake.

According to a preferred embodiment of the invention, it is provided that the adjusting rotating device has an adjusting nut into which a rotating spindle is screwed which, on one of its ends, has a thrust piece acting upon the brake pad, in which case the release device acts upon the adjusting nut or the rotating spindle.

This simple constructive implementation of the adjusting rotating device with an adjusting nut and a rotating spindle, which are in each case driven by an electric motor, permits the providing of a separate adjusting rotating device with an electric-motor drive on each side of the disk brake. This can be used, for example, in the case of disk brakes which are constructed as fixed calipers or as a caliper with a very small displacement or swiveling path.

As an alternative, it is conceivable that the adjuster rotating device has a rotating spindle onto which an adjusting nut is screwed which, on one of its ends, has a thrust piece acting on the brake pad, in which case the release device acts upon the adjusting nut or the rotating spindle.

Many different mechanical implementations are conceivable with respect to the release device for an adjusting rotating device with an adjusting nut and rotating spindle.

Expediently, the ramp profile is molded, particularly impressed, directly into the face of the adjusting nut or rotating spindle.

The caliper or an element of the application unit is expediently the supporting element. In this case, an opposite ramp profile can be molded directly into the caliper or the element of the application unit.

Advantageously—since it is easy to manufacture—the ramp profile is molded into a ramp disk which is non-rotatably disposed on the face of the adjusting nut or the rotating spindle.

A particularly cost-effective variant is distinguished in that the release device is constructed in such a manner that the pressure supporting surface of the adjusting nut is equipped with a ramp profile, in which case a supporting disk with an opposite ramp profile rests on the pressure supporting surface, and in which case the flat back side of the supporting disk rests against a supporting surface of a supporting element.

This supporting element may, for example, be the caliper or, on the side of the application device, a brake lever, or an additional force transmission element placed between the brake lever and the rotating spindle or adjusting nut.

The release device is preferably arranged only on the side of the brake situated opposite the application device. For releasing or adjusting the brake release play in the initially described special case of the applied brake, it is sufficient for the brake to be released from its application at least on one side. Because of the supporting of the rotating spindles on the caliper, the corresponding release device can be arranged between the caliper and the thrust piece. Naturally, a variant with a release device on both sides of the brake disk or on the side of the application device is also conceivable.

The invention makes it possible in a simple manner to displace the brake lever and/or the piston unit by a defined amount during each activation of the adjusting system in the direction of the brake disk by means of a mechanism which, also when the brake is applied, can be released again by the adjusting device or releases automatically, after previously the electric-motor actuating drive, with the assistance of the release device, has moved the thrust pieces so far away from the brake disk that, in the event of a possibly unacceptably small brake release play, because of a heating and application of the brake, at least the amount of the desired brake release play is reached.

In this case, the wear adjusting device is operated until the brake shoes have contact with the brake disk. Subsequently, by releasing the brake release play securing mechanism, the desired brake release play is restored in that the brake lever and/or the piston unit are moved by means of the actuating drive or automatically again by the defined amount away from the brake disk.

This method facilitates also the adjusting of the brake release play per se because the desired brake release play is defined by the amount of the advancing stroke of the brake release play securing mechanism or of the release mechanism as a fixed construction characteristic and does not have to be adjusted by an electronically controlled restoring of the adjusting spindles.

As an alternative to the described ramp system, it is also possible to provide a type of clamping roller free wheel or a clamping body free wheel as the release device. These two variants of the release device can also be constructively implemented in a cost-effective manner and can also be mounted particularly compactly between the adjusting nut and the caliper or another supporting element. Thus, it is possible to provide indentations on the face of the adjusting nut or in a ring placed thereon, which indentations receive the clamping bodies. In the case of a clamping roller system, these indentations are preferably ramp-shaped. In the case of a clamping body system, they are preferably constructed parallel to the supporting surface.

According to the method of the invention, first, for adjusting the brake release play by one controlling of the driving motor, a restoring of the rotating adjusting spindles can take place for securing the minimum brake release play. Subsequently, another controlling takes place in the sense of an advancing movement of the adjusting rotating spindles, while simultaneously the advancing movement of the brake release play securing device is triggered. After a sufficiently dimensioned waiting time, which is designed such that the brake shoes can be placed against the brake disk, by means of the actuating drive, a reversely rotating release pulse for securing the brake release play is initiated in order to secure the desired brake release play in this manner. In this manner, a very reliably operating electromechanical wear adjusting device is implemented by very simple means and low sensing and controlling expenditures.

As an alternative to observing a waiting period, the end of the rotating movement of the motor can be determined by a sensing (stop detection), or the stopping point in time of the actuating drive can be determined by means of an excess current sensor.

Other objects, advantages and novel features of the present invention will become apparent from the following detailed description of the invention when considered in conjunction with the accompanying drawings.

DETAILED DESCRIPTION

Figure 1:
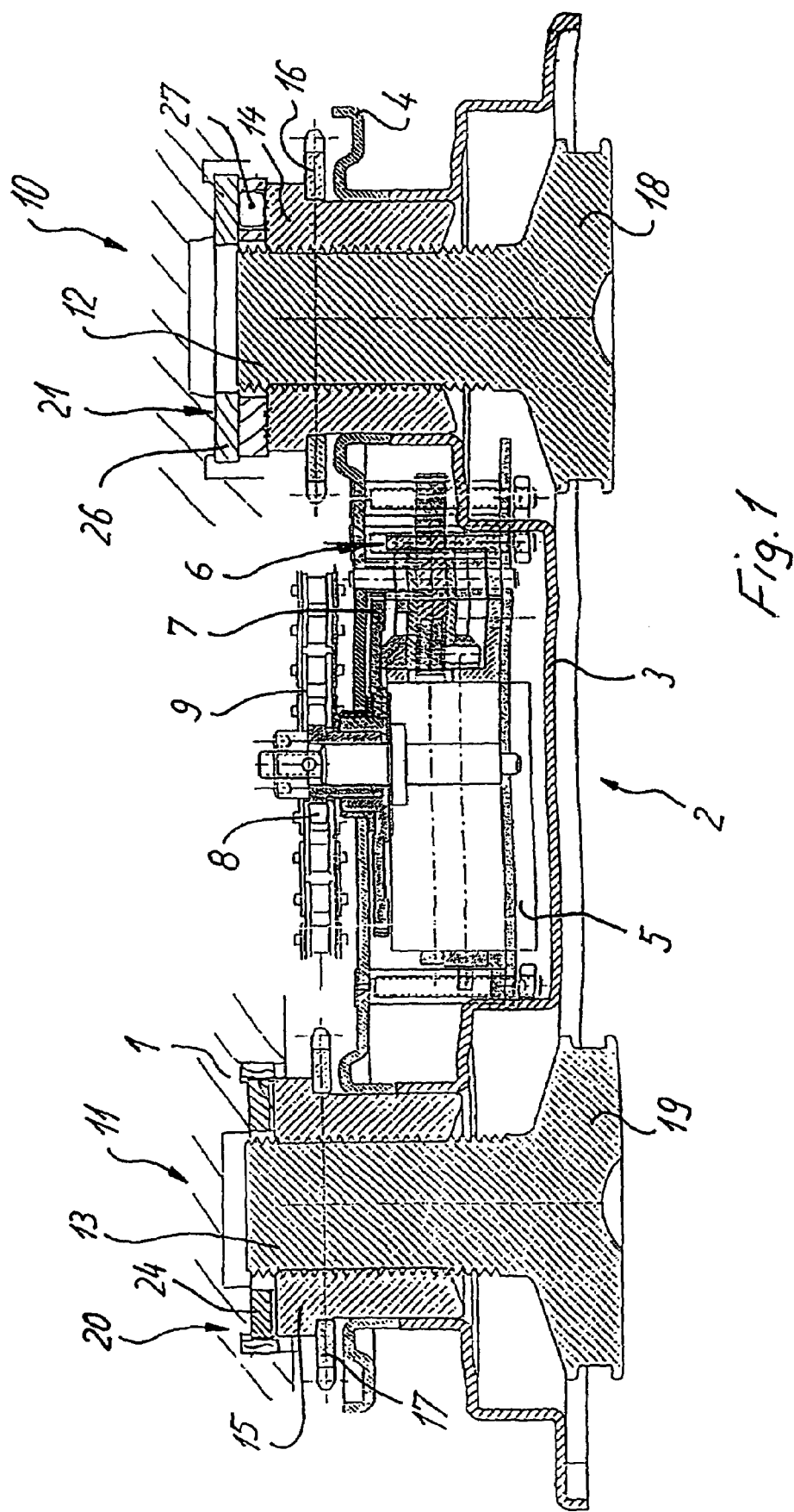
FIG. 1 is a sectional view of a part of a disk brake having an adjusting system for adjusting the brake pad wear in accordance with an embodiment of the present invention.

FIG. 1 will be described first. FIG. 1 essentially illustrates an adjusting module for a disk brake which has a caliper 1.

The area of the brake situated opposite the application device is illustrated here.

The application device can be constructed, for example, in the manner of the initially mentioned patent document.

Figure 8:
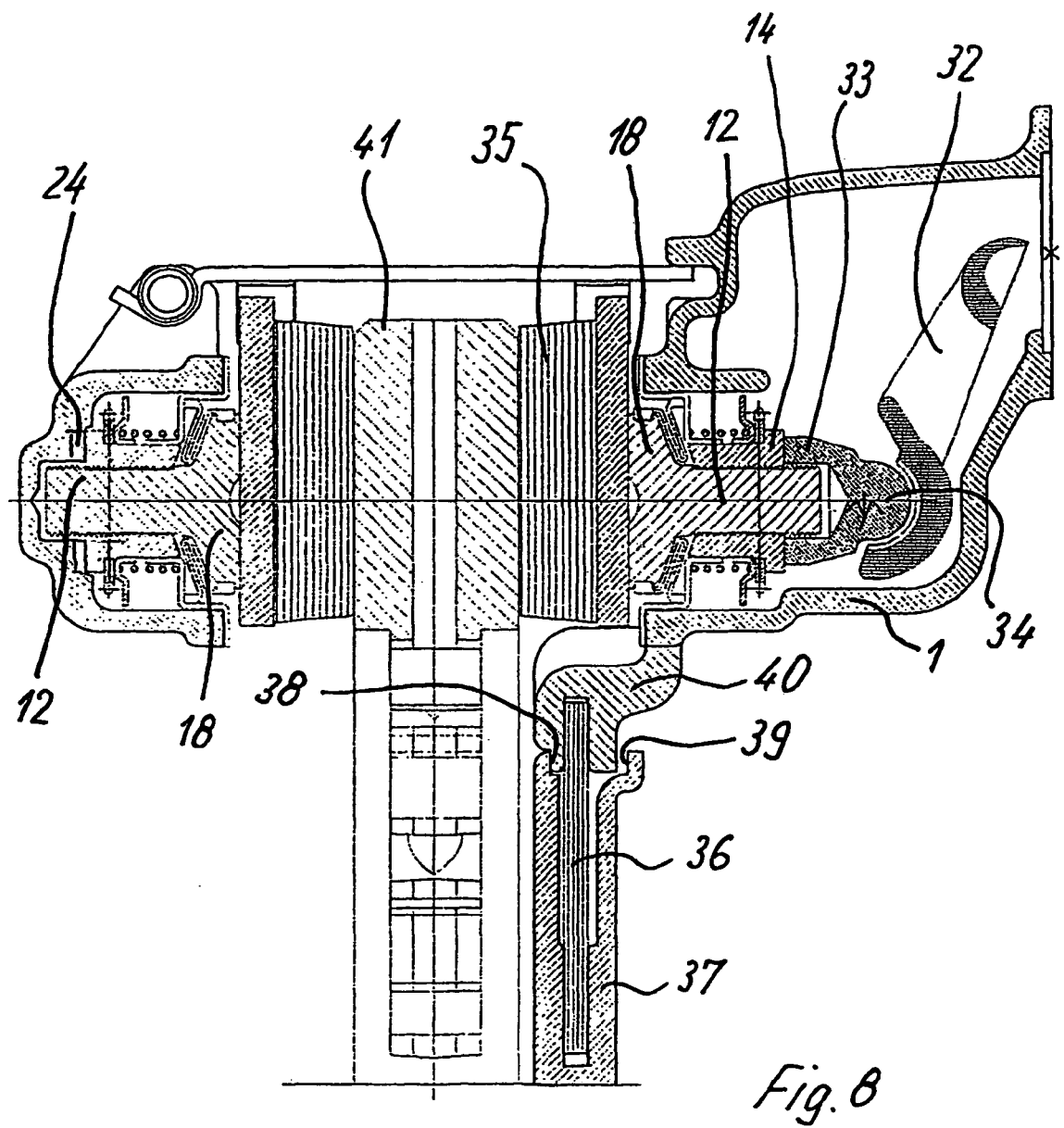
FIG. 8 is a sectional view of a disk brake.

However, the present construction also relates to a fixed-caliper disk brake or a disk brake with only a very slight displacement or swivelling path of the caliper, in which case an adjusting of the brake pad wear preferably also has to take place on the side of the brake disk situated opposite the application device (see FIG. 8).

An adjusting module 2 is arranged in a recess of the caliper 1. This adjusting module 2 comprises a first mounting plate 3 and a second mounting plate 4 attached to the first mounting plate 3. Here, an electric motor 5 is arranged on the mounting plate 3, which electric motor 5 drives a chain 9 by means of a transmission 6 with gear wheels 7 and 8, which chain is guided around two mutually parallel arranged adjusting rotating devices 10, 11, which each have a rotating spindle 12, 13 screwed into adjusting nuts 14, 15, onto which gear wheels 16, 17 are respectively placed with which the chain 9 meshes. It is also conceivable to arrange the electric motor on the outside on the caliper and to connect it with the transmission by way of a shaft penetrating the caliper (not shown).

At its end facing away from the brake disk, that is, situated toward the caliper, the adjusting rotating device is supported on the caliper 1. At their end facing the brake disk, the adjusting rotating spindles 12, 13 each have thrust pieces 18, 19 which act upon the brake pads which are not shown here.

For adjusting the brake, the adjusting nuts are rotated by means of the electric motor 3 and the transmission as well as the gear wheels 7, 8 and the chain 9, so that the rotating spindles 12, 13 are displaced in the direction of the brake disk.

Between the adjusting nuts 14, 15 and the caliper 1—purely as an example—different elements are in each case arranged at the left adjusting nut and the right adjusting nut 14 in order to explain the invention in detail on two different variants. In practice, the release devices 20, 21 have an identical design.

According to the invention, the releasing of the rotating spindles from brake pads and the releasing of the brake pads from the brake disk respectively is facilitated by mechanically operating release devices 20, 21. This means that the effect of the electric motor 5 is assisted during the release of the adjusting device 10, 11.

Figure 2:
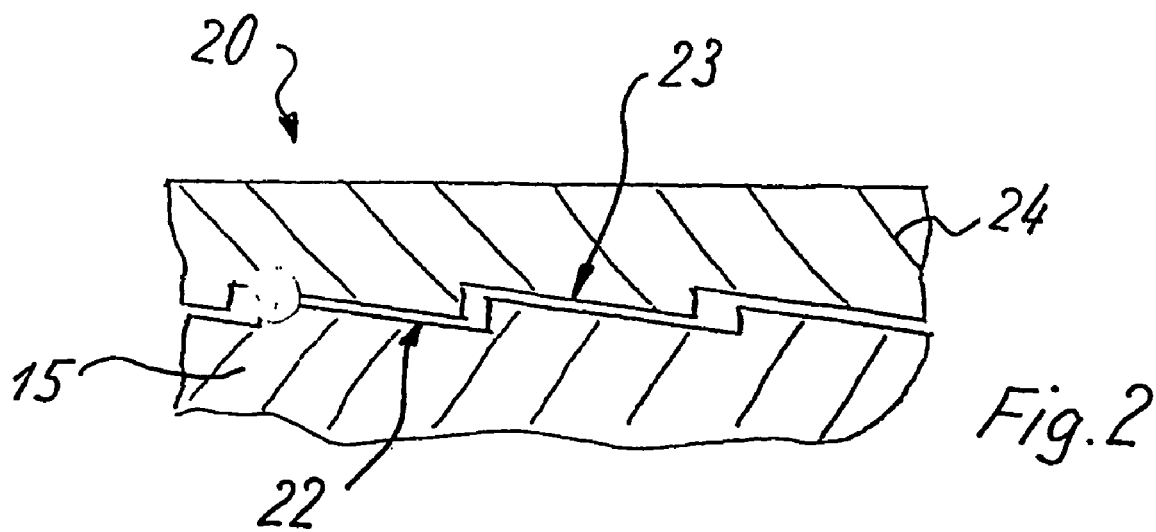
FIGS. 2 to 4 are sectional views of elements of different variants of release devices for wear adjusting systems in accordance with various alternative embodiments of the present invention.

In the case of the operating principle of the release device 20 illustrated in the left area of the drawing as well as in FIG. 2, the supporting surface of the adjusting nut 15 is equipped with a ramp profile 22 (see FIG. 2), which interacts with a corresponding ramp profile 23 of a supporting disk 24 axially adjoining the adjusting nut 15 and being supported on the caliper 1 with its surface facing away from the adjusting nut. The flat back side of the supporting disk 24 ensures the transmission of the reaction force from the piston system in this form on the caliper.

During an operation of the brake, the reaction force resulting from the application force of the brake is deflected from the thrust piece 19 by way of the adjusting thread between the rotating spindle 13 and the adjusting nut 15 to the adjusting nut 15 and, by way of its face away from the brake disk and provided with the ramp profile, to the supporting disk 24 and, from there, to the supporting surface at the caliper 1.

This facilitates the release of the adjusting rotating device in a simple mechanical manner.

The ramp profile can be impressed directly into the corresponding face of the adjusting nut 15 or can be entered there in a different manner. The ramp profile may also be contained in an additional ramp disk which rests on the face of the adjusting nut (not shown here).

During a brake release play adjusting operation by means of the electromechanical drive 5, a rotation of the adjusting nut 15 first takes place in the sense of a rotating-out of the thrust piece 19 connected with the adjusting thread bolt or the rotating spindle 13 or constructed in one piece.

At the start of the adjusting movement, the adjusting nut 15 first rotates against the ramp disk 24 by a predetermined rotating angle until a stop has been reached. Then, corresponding to the slope of the ramp profile, the adjusting nut 15 is displaced by a predetermined amount, together with the screwed-in thrust piece 19, against the brake disk.

The amount of this displacement corresponds to the constructively defined desired brake release play.

During this first, limited part of the adjusting movement, an adjustment of the thrust piece 19 relative to the adjusting nut 15 can already take place by way of the adjusting thread. In this case, the desired brake release play is obtained from the sum of the axial adjusting movements of the adjusting nut 15 relative to the caliper 1 and to the thrust piece 19 relative to the adjusting nut 15.

It is also possible to avoid the adjustment of the thrust piece 24 relative to the adjusting nut 15 in the area of the rotation of the adjusting nut 15 provided for securing the brake release play, in that the protection against rotation of the thrust piece 15 and of the adjusting thread bolt (rotating spindle 13) respectively is provided with a swivel play, whose amount corresponds to the rotating angle of the adjusting nut 15 required for securing the brake release play.

For ensuring the operability of the release device, it is advantageous for the rotating inhibition of the supporting disk 24 against the supporting surface on the caliper 1 in each operating condition to be greater than the rotating inhibition between the adjusting nut 15 and the supporting disk 24.

This means that, at the start of the rotating movement of the adjusting nut 15, the supporting disk with the ramp profile 23 during the displacement of the adjusting nut 15 is to adhere to the supporting surface of the caliper without any rotation and, only after the rotating stop has been reached, is to continue to rotate in the sense of the actual adjusting movement of the pressure piece 19 with the adjusting nut 15.

Such a rotating inhibition of the ramp disk can be implemented in a simple manner.

Thus, for example, a friction-increasing coating can be provided on the supporting surface of the ramp disk 24. As an alternative or in addition, it is also possible to provide a friction-reducing coating on the side of the ramp profile 22, 23.

For example, by means of a diamond dust coating, a friction increase can be obtained up to coefficients of friction of 0.5. A friction reduction can be implemented in a simple manner by means of a sliding lacquer coating.

As an alternative, it is also possible to provide a type of braking mechanism on the ramp disk 34 for increasing the rotating inhibition. This can be implemented, for example, by a frictional force on the circumference of the ramp disk 24, preferably by means of a sliding spring element in the manner of a tolerance ring (not shown).

Figure 3:
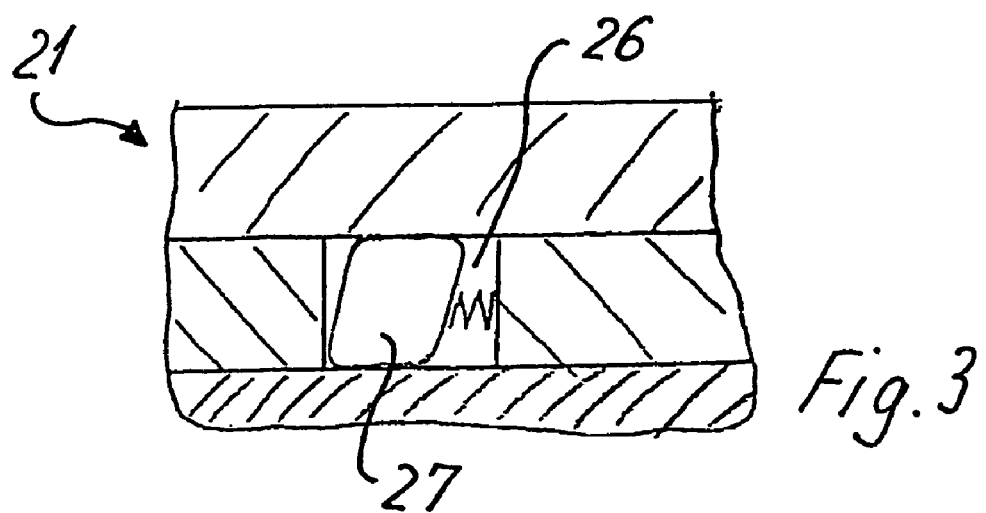

As an alternative, it is also possible to use, in the manner of FIG. 2 and 3, instead of a ramp system, a release device 21 in the manner of a clamping roller free wheel or a clamping body free wheel for the axial adjustment.

Figure 4:
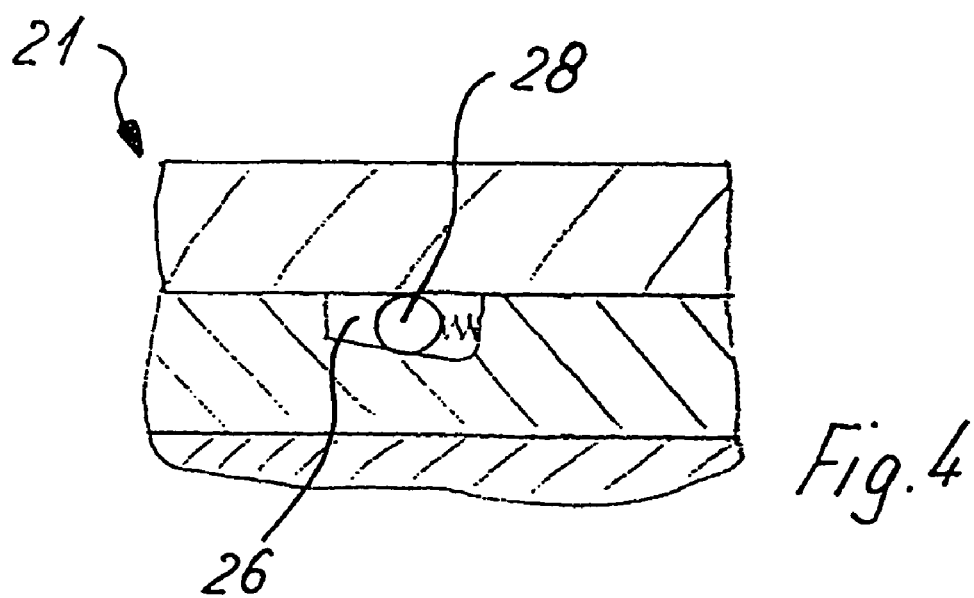

As illustrated in the right part of FIG. 1 as well as in FIGS. 3 and 4, in the case of an implementation as a clamping roller free wheel as well as in the case of an implementation as a clamping body free wheel, recesses 25 are provided on the face of the adjusting nut 14 or—illustrated here—in a ring 26 arranged between the adjusting nut and the supporting disk 24, which recesses 25 accommodate the clamping bodies 27 or the clamping rollers 28.

In the case of a clamping roller system (FIG. 3), these indentations 26 are provided with a ramp shape. In contrast, in the case of the clamping body system (FIG. 2), they extend parallel to the supporting surface.

In the case of the clamping body system, because of their free-wheeling clamping effect, the clamping bodies 27 swivel when the adjusting movement begins. The resulting height difference of the clamping bodies causes the axial adjustment of the adjusting nut 14.

In contrast, in the case of the clamping roller system of FIG. 4, when the adjusting movement starts, the free-wheel-type locking effect of the clamping roller 28 engages. Since, because of the rotating inhibition of the upper, in this case, flat supporting disk 24, the latter cannot be moved, the clamping rollers 28 roll upward on the ramp planes and, in the process, cause the axial adjustment of the adjusting nut 14.

The further course of the brake release play adjustment preferably takes place such that, by way of a continued rotation of the adjusting nut 14, the thrust piece 18 is screwed out so far that the brake shoe or the brake pad comes in contact with the brake disk. As a result of the now acting frictional forces in the force transmission path (thrust piece contact surface, adjusting thread, ramp disk supporting surface), the further adjusting movement is stopped. After the detection of this condition, for example, by way of the current consumption of the electric motor or after a sufficiently dimensioned stopping time in this condition, the adjusting nut 14 is rotated back by the rotating angle required for releasing the brake release play.

In the critical case that, specifically at the moment at which, during a brake release play adjusting operation, the brake shoes are placed against the brake disk, another braking is initiated, the adjusting nut 14 can now be rotated back by the electrical adjusting mechanism, also when the brake is applied, in a simple manner into its initial position restoring the brake release play. This can be achieved because the rotating resistance in the clamping body, the ball ramp or sliding ramp mechanism in the releasing direction is so low because of the selected geometries on the ramp system or in the clamping system that the releasing becomes possible at very low expenditures of force or takes place almost automatically.

Thus, it is, for example, in the case of the ramp system of FIGS. 1 and 2, to select the ramp angle with approximately 10° such that, under the given frictional conditions (steel on steel, hardened), a freedom from self-locking occurs anyhow.

In the case of the brake release play adjusting operation, when the brake shoes are applied, the resulting reaction force has to be compensated proportionately by corresponding adjusting forces of the adjusting rotating device because a reverse rotating force is generated by way of the sliding ramp which has no self-locking.

When now a service braking takes place at a high force, the adjusting force of the adjusting rotary drive is overcome and the adjusting nut 14, 15 is automatically rotated back into its initial position securing the brake release play. When a ball ramp or clamping body system is used, this process takes place in an equivalent form.

In the case of a disk brake of the initially mentioned construction having a sliding caliper, it is also possible that, when a brake release play adjusting operation is initiated, the brake lever is advanced by a certain amount corresponding to a minimum brake release play in the sense of an application movement. The brake release adjustment then takes place in the manner described in German Patent Document DE 197 31 696 A1. After the brake shoes were applied, the lever is restored into its initial position and the brake release play is thereby adjusted. The advancing stroke of the brake lever securing the brake release play can take place by means of a separate adjusting device, but preferably by means of the electromechanical adjusting drive in that, by way of an element driven by the same actuating drive, such as an eccentric cam, the advancing stroke of the brake lever is generated at the beginning of the adjusting movement.

In the case of the brake of the initially mentioned type, it is also possible to displace the traverse relative to the brake lever by the amount of the brake release play in the direction of the brake disk. Thus, for example, in the case of an adjusting synchronization shaft which extends through the eccentric axis and has bevel gears at the ends, when the adjusting system is operated, as a result of eccentric cams or radial cams connected with the synchronization shaft, the eccentric bolt is lifted off its seat in the traverse by the amount of the defined brake release play.

Figure 6:
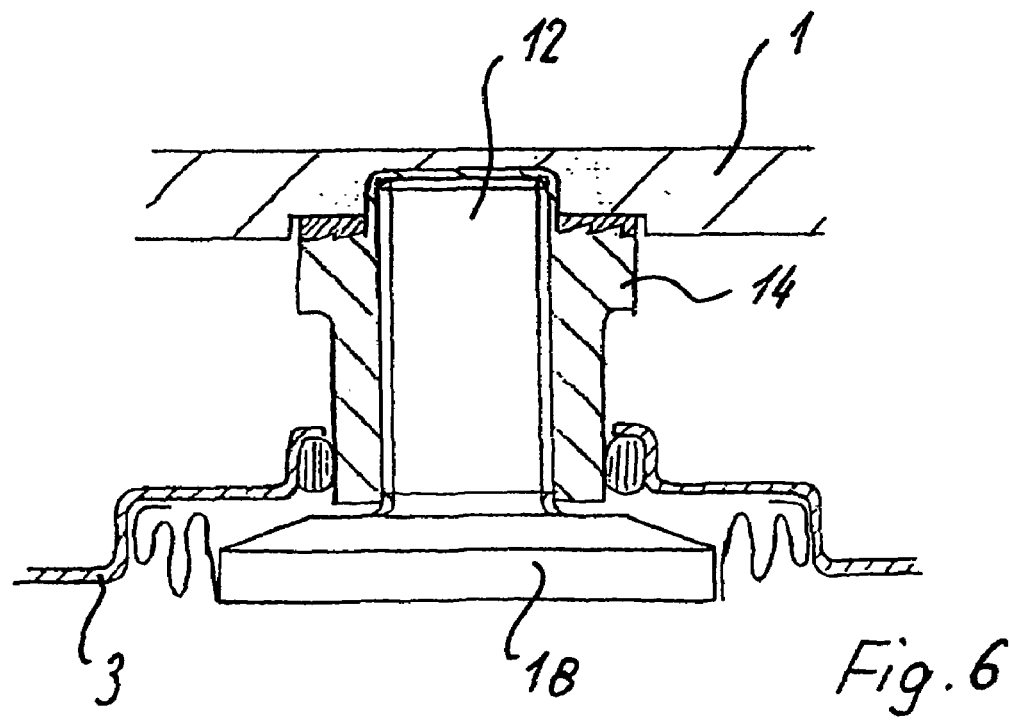

According to FIG. 6, the adjuster rotating device 10 has the adjusting nut 14 into which the rotating spindle 12 is screwed, which, on one of its ends, has the thrust piece 18 acting upon the brake pad. The ramp profile is constructed, on the one side, in the caliper 1 and, on the other side, on the face of the adjusting nut 24.

Figure 5:
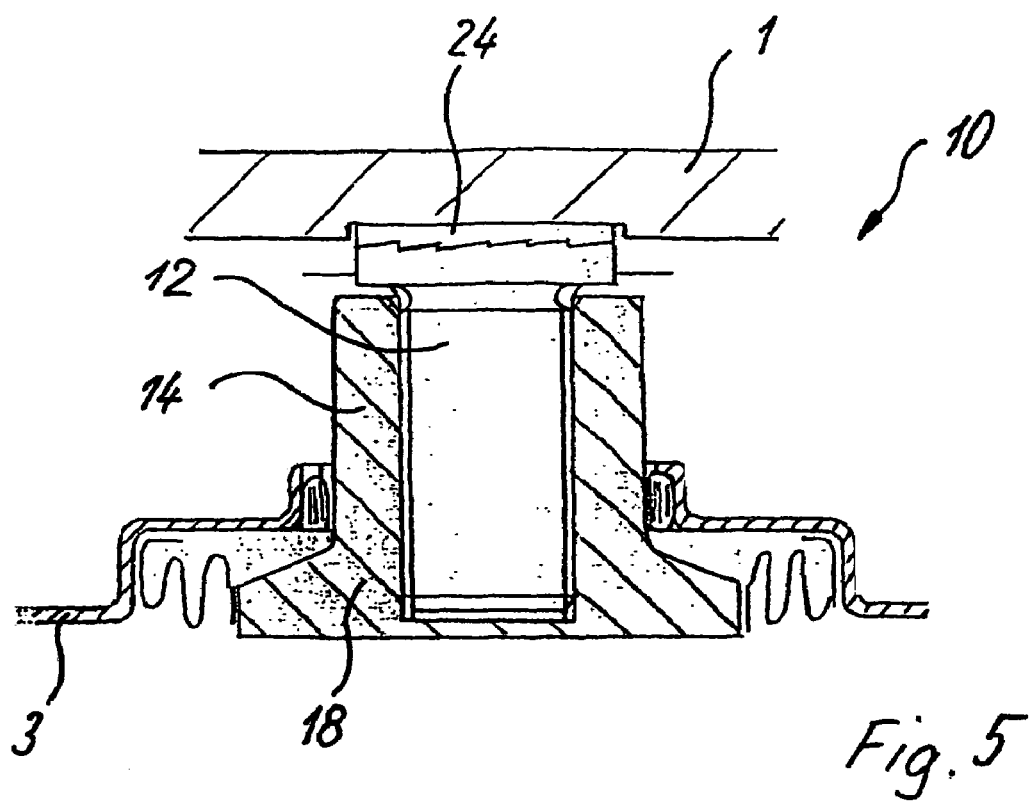
FIGS. 5, 6 are sectional views of elements of adjusting rotating devices in accordance with various alternative embodiments of the present invention.

In contrast, according to FIG. 5, the adjusting nut 14 has the thrust piece 18 (it is molded onto the adjusting nut 14 here), and the rotating spindle 12 with a screw-type head is supported at its axial end facing away from the adjusting nut—thus, in the area of its head—itself on the ramp disk 24 and, in the area of the face of the head, itself has a corresponding ramp profile.

Figure 7:
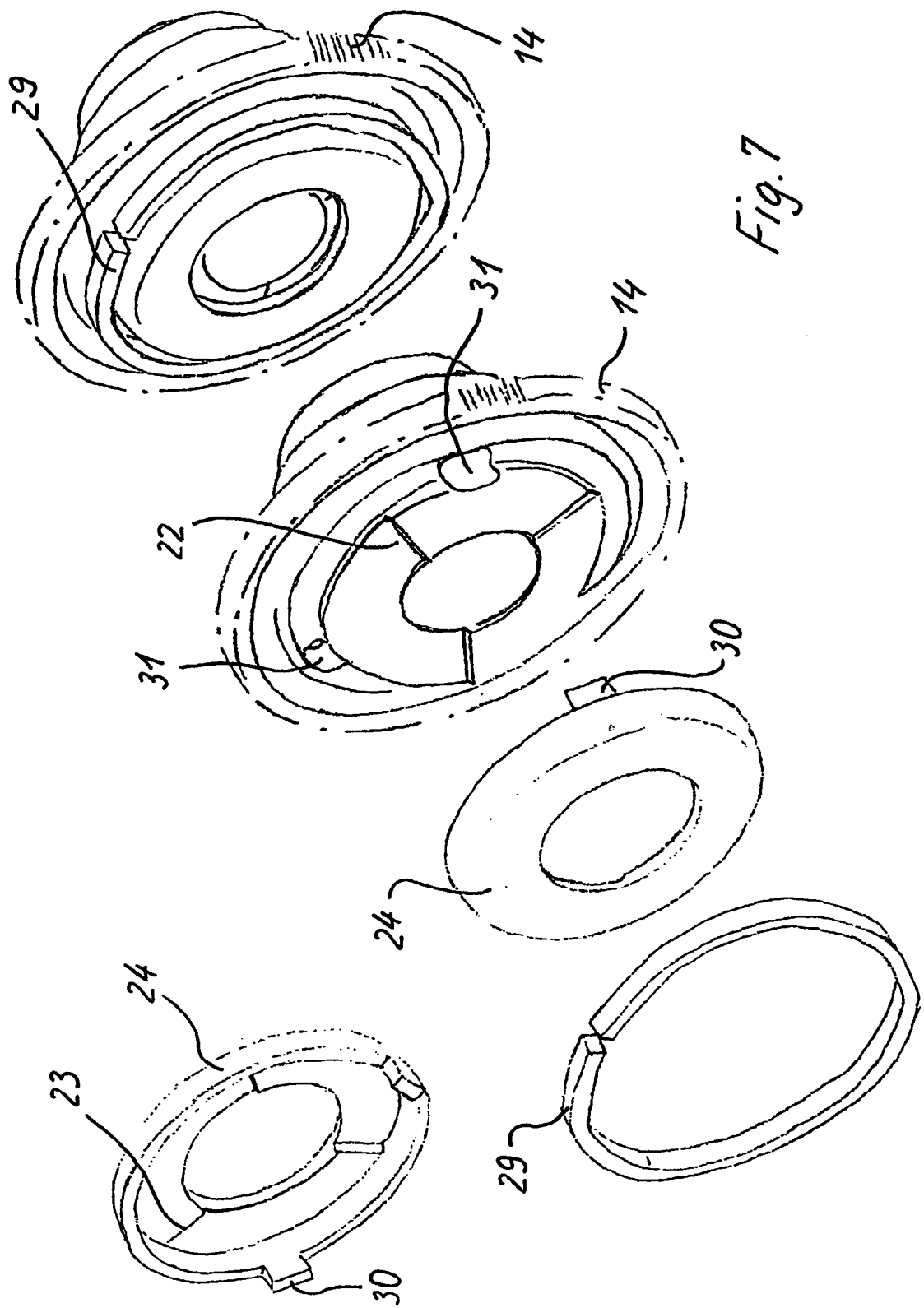
FIG. 7 is an exploded view of an adjusting nut with a ramp disk and a view of the assembled elements in accordance an embodiment of the present invention.

FIG. 7 is a perspective view of an adjusting nut 14 which has the ramp profile on its face. The ramp disk 24 can be placed on this face, which ramp disk 24 is surrounded by a friction spring 29 as a brake element increasing the rotating inhibition.

For ensuring the release function, pins 30 at the ramp disk engage in appropriately dimensioned recesses 31 of the adjusting nut and are used for securing the rotating angle. At the right edge of FIG. 7, a unit is illustrated which is preassembled from elements illustrated in the left part of FIG. 7.

FIG. 8 is a sectional view of a hinged-caliper disk brake, in which the elements illustrated in FIGS. 1 to 7 can be used.

The application device comprises a rotary lever 32 which can be operated by a piston rod of a brake cylinder (not shown here) and is supported on the caliper 1 by bearing elements, such as balls, which are not visible here. On its side facing away from the caliper 1, rotary lever 32 acts at one or two points upon an intermediate element 33, which has a hemispherical projection 34 on one of its ends.

When the rotary lever 32 is swiveled, the lower eccentric-type end (not visible here) of the rotary lever 32 causes an advancing of the intermediate element 33 in the direction of the brake disk 41. The intermediate element 33, in turn, presses an adjusting nut 14 toward the front, in which an adjusting spindle is screwed to the thrust piece which rests against a brake pad 35 and advances it during brakings.

So that, with an increasing brake pad wear, the latter does not have to compensated by a correspondingly large swiveling movement of the caliper 1, an adjusting device (one or two adjusting rotating drives) is also provided on the side of the brake disk 41 situated opposite the application device, the adjusting nuts 14 of the adjusting device here having been supported in each case on ramp disks 24 whose flat back sides are situated on the interior caliper surface.

The caliper 1 must only bridge the working stroke during the application of the brake by means of a swiveling. This is implemented by a type of elastic spring 36, which is arranged between the caliper 1 and a projection 37 fastened to a wheel axle, the swiveling angle of two stops 38, 39 being fastened between a lower projection 40 of the caliper and the wheel axle projection 37.

On the side of the brake disk situated opposite the application device, the ramp disks 24 are arranged between the caliper and the adjusting nut.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disk brake apparatus, comprising:
   a caliper reaching over a brake disk;
   an application device for applying brake pads disposed in the caliper to the brake disk;
   at least one adjusting system arranged in the caliper and cooperating with the application device for adjusting a distance between at least one brake pad and the brake disk, wherein the adjusting system includes at least one adjuster rotating device driven by an electric-motor drive; and
   at least one adjusting system release device for assisting the return of the adjuster rotating device to a release position following actuation of the adjusting system.

2. The apparatus according to claim 1, wherein the adjuster rotating device has an adjusting nut into which a rotating spindle is screwed which, at one of its ends, has a thrust piece acting upon one of the brake pads, the release device acting upon one of the adjusting nut and the rotating spindle.

3. The apparatus according to claim 2, wherein the release device includes a ramp disk with a ramp profile opposing a corresponding ramp profile provided on a pressure supporting surface of the adjusting nut, the ramp disk having a non-ramped surface resting on a supporting surface of a supporting element.

4. The apparatus according to claim 3, wherein the ramp disk and the supporting surface cooperate such that the supporting surface inhibits ramp disk rotation more than one of the adjusting nut and the rotating spindle inhibits ramp disk rotation.

5. The apparatus according to claim 4, wherein the ramp disk is provided with one of a friction-increasing coating on the non-ramped surface of the ramp disk and a friction-reducing coating on the ramp profile.

6. The apparatus according to claim 5, wherein the friction-increasing coating is a diamond dust coating.

7. The apparatus according to claim 5, wherein the friction-reducing coating is a sliding lacquer coating.

8. The apparatus according to claim 4, wherein a rotating-inhibition-increasing braking element is disposed between the supporting surface and the ramp disk.

9. The apparatus according to claim 8, wherein the rotating-inhibition-increasing braking element is one of a tolerance ring and a friction spring.

10. The apparatus according to claim 3, wherein the ramp profile is formed directly into the face of at least one of the adjusting nut and rotating spindle.

11. The apparatus according to claim 10, wherein the ramp profile is formed directly into the face of at least one of the adjusting nut and rotating spindle.

12. The apparatus according to claim 3, wherein the supporting element is one of the caliper and an element of the application unit.

13. The apparatus according to claim 3, wherein the ramp profile is formed directly into one of the caliper and an element of the application unit.

14. The apparatus of claim 3, wherein the ramp disk non-rotatably rests on the face of one of the adjusting nut and the rotating spindle.

15. The apparatus according to claim 3, wherein a ramp angle of the ramp profile is set to preclude self-locking of the release device.

16. The apparatus according to claim 1, wherein the adjuster rotating device has a rotating spindle onto which an adjusting nut is screwed which, at one of its ends, has a thrust piece acting upon one of the brake pads, the release device acting upon one of the adjusting nut and the rotating spindle.

17. The apparatus according to claim 16, wherein the release device includes a ramp disk with a ramp profile opposing a corresponding ramp profile provided on a pressure supporting surface of the adjusting nut, the ramp disk having a non-ramped surface resting on a supporting surface of a supporting element.

18. The apparatus according to claim 17, wherein the ramp disk and the supporting surface cooperate such that the supporting surface inhibits ramp disk rotation more than one of the adjusting nut and the rotating spindle inhibits ramp disk rotation.

19. The apparatus according to claim 18, wherein the ramp disk is provided with one of a friction-increasing coating on the non-ramped surface of the ramp disk and a friction-reducing coating on the ramp profile.

20. The apparatus according to claim 19, wherein the friction-increasing coating is a diamond dust coating.

21. The apparatus according to claim 19, wherein the friction-reducing coating is a sliding lacquer coating.

22. The apparatus according to claim 18, wherein a rotating-inhibition-increasing braking element is disposed between the supporting surface and the ramp disk.

23. The apparatus according to claim 22, wherein the rotating-inhibition-increasing braking element is one of a tolerance ring and a friction spring.

24. The apparatus according to claim 17, wherein the supporting element is one of the caliper and an element of the application unit.

25. The apparatus according to claim 17, wherein the ramp profile is formed directly into one of the caliper and an element of the application unit.

26. The apparatus of claim 17, wherein the ramp disk non-rotatably rests on the face of one of the adjusting nut and the rotating spindle.

27. The apparatus of claim 17, wherein a ramp angle of the ramp profile is set to preclude self-locking of the release device.

28. The apparatus according to claim 1, wherein the release device includes at least one of a clamping roller and a clamping body.

29. The apparatus according to claim 28, wherein at least one indentation on a face of the releasing device accommodates one of the at least one clamping body or clamping roller.

30. The apparatus according to claim 29, wherein the at least one indentation has a ramp shape.

31. The apparatus according to claim 29, wherein the at least one indentation is arranged to form a clamping body system parallel to the supporting surface.

32. An apparatus according to claim 1, wherein the release device is electromechanical.

33. The apparatus according to claim 32, wherein the release device includes piezo bodies disposed such that, when energized the piezo body geometry assists movement of the adjusting mechanism to the release position.

34. A method of controlling an adjusting system of the apparatus of claim 1, comprising the steps of:
  setting the adjuster rotating device to an initial adjustment position;
  controlling the adjuster rotating device to engage the adjuster system release device and then advance at least one brake pad toward the brake disk; and
  controlling the adjuster rotating device to retract the at least one brake pad a predetermined distance corresponding to a desired brake play, wherein
  the retraction of the at least one pad is initiated after one of a predetermined time period and a determination that the at least one brake pad contact has contacted the brake disk, and
  the adjuster system release device immediately disengages the adjuster rotating device when the one adjuster rotating device begins to retract the at least one brake pad.

* * * * *